United States Patent [19]
Fukuda

[11] 3,792,607
[45] Feb. 19, 1974

[54] AIR LEAKAGE DETECTOR USING A DIRECT PRESSURE SYSTEM

[76] Inventor: Akira Fukuda, 2-22-8 Kasuga-cho, Nerima-ku, Tokyo, Japan

[22] Filed: May 5, 1972

[21] Appl. No.: 250,751

[30] Foreign Application Priority Data
Aug. 7, 1971  Japan.............................. 46-59834

[52] U.S. Cl. ............................................... 73/49.3
[51] Int. Cl. ............................................ G01m 3/02
[58] Field of Search ......... 73/40, 41, 45, 45.1, 45.2, 73/45.9, 49.2, 49.3, 52, 149

[56] References Cited
UNITED STATES PATENTS

| | | |
|---|---|---|
| 2,924,965 | 2/1960 | Westerheim............................ 73/40 |
| 3,028,750 | 4/1962 | Rondeau................................. 73/40 |
| 3,504,528 | 4/1970 | Weinberg............................. 73/49.3 |
| 3,355,932 | 12/1967 | Mulligan............................. 73/49.3 |

Primary Examiner—S. Clement Swisher

[57] ABSTRACT

An apparatus for the detection of both small and large leaks in articles. A test article and a reference article are each placed in separate receptacles, subject to a fluid pressure and the receptacles isolated from each other. Should a small leak be present a difference in pressure will appear between the two receptacles. For detecting large leaks, an additional receptacle is placed in communication with each of the receptacles and the pressure difference is checked.

1 Claim, 1 Drawing Figure

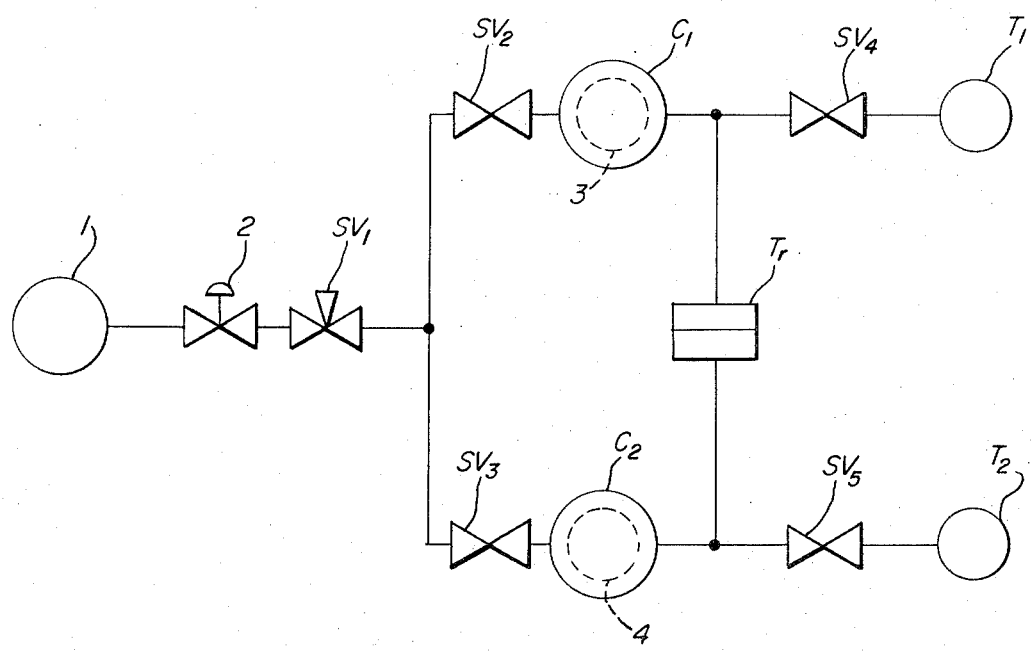

AIR LEAKAGE DETECTOR USING A DIRECT PRESSURE SYSTEM

The single FIGURE of drawing is a schematic representation of the invention.

The present invention may be described by an example, such as the one given in the accompanying drawings. The key for the drawing is as follows: 1: source of compressed air; 2: decompression valve; SVI: three-way electromagnetic valve; SV2, SV3, SV4, SV5: two-way electromagnetic valves; CI: air-tight receptacle intended to hold the test piece (3) which is to be tested for leakage; C2: Air-tight receptacle intended to hold the reference piece (CI and C2 have the same dimensions); T$r$: the transducer for detecting the difference in air pressure; TI and T2: air-tight receptacles with smaller dimensions than CI and C2.

The following procedure is applied with regard to both flow conduits. The decompression valve is used to reduce the air pressure resulting from the supply of compressed air. The electromagnetic valves SVI, SV2, and SV3 are opened, and, keeping the electromagnetic valves SV4 and SV5 closed, air is introduced into receptacles C1 and C2. After a while, valves 2 and 3 are closed. Assuming 30CC for remaining volume of receptacles which contained the test piece (3) and the reference piece (4), and 2 cc for the test piece (3), these are then subjected to an air flow at a pressure of 5 kg/cm²G. If there is no leakage, the quantity of air should be 5 kg/cm² G × 30 cc; if there is a leak, the volume should be 5 kg/cm² G × (30+2) cc. When only a small leak is involved, the result is, as explained above, a difference of pressure between the two receptacles, CI which contains the test piece 3, and C2 which contains the reference piece 4. The leak may be measured by means of a transducer (T$r$), except, however, in the case of a major leak, which renders measurement impossible for the reason that the entry of the compressed air into the two receptacles for an extended period results in the pressure inside CI and C2 being the same. The aim of the pressure invention is to be able to detect precisely the force of leaks, even in the case of major ones. The same procedure, of introducing compressed air into the two receptacles CI and C2, is used for a major leak. When the current is cut, the electromagnetic valves open, allowing air to penetrate the inner parts of the apparatus, CI and C2 as well as TI and T2, which are at atmospheric pressure.

One first opens valves SV4 and SV5, and with valve SVI closed, compressed air is introduced into receptacles CI and C2. After a period of time, the electromagnetic valves SV2 and SV3 are closed. When there is no leak in the test piece, the quantity of air will be 5 kg/cm²G× 30 cc. In the case of a leak, this quantity will instead be 5 kg/cm² G × (30+2) cc. If the receptacles CI and C2 are considered alone, they will both have the same air pressure; if, however, valves SV4 and SV5 are opened, the pressure will be changed as it passes to containers TI and T2.

For example, in the case of no leakage, the volume of the receptacle, 30 cc, and the volume of the container, 2 cc, give a total volume of 32 cc, providing the following formula:

$5 \text{ kg/cm}^2\ G \times 30 \text{ cc} = x \text{ kg/cm}^2\ G \times 32 \text{ cc}$ The resulting formula for determining $x$ is:

$x = 30/32 \times 5 = 0.9375 \times 5 = 4.6875 \text{ kg/cm}^2\ G$

In the case of leakage:

Volume of the air-tight receptacle + volume of the test piece leak = volume of the container = 34 cc.

Or:

$5 \text{ kg/cm}^2\ G \times 32 \text{ cc} = x \text{ kg/cm}^2\ G \times 34 \text{ cc}$ The value of $x$ is therefore:

$x = 32/24 \times 5 = 0.94117 \times 5 = 4.70585 \text{ kg/cm}^2\ G$

The difference in pressure between the two is $4.70585 - 4.6875 = 0.01835 \text{ kg/cm}^2\ G$. The pressure is higher on the side where the leak occurs, thus making it possible to detect the leak.

As the volume of the container is small, the pressure on the inside differs only negligibly from that of the pressure externally supplied. However, an increased volume container will result in a lowering of the interior pressure of the containers proportionate to the pressure supply.

As suggested above, the leakage detector of the present invention can use containers of smaller dimensions than the traditional compressed air containers placed in front of the air-tight receptacles. It is for this reason that this apparatus may be described as simple in structure and easy to construct. Not only is it smaller, but it performs in a much more efficient and effective manner than traditional devices. We have seen that it is possible to measure smaller leaks quite easily either before or after measurement of major leaks.

I claim:

1. A leakage detector comprising a source of air pressure other than atmospheric, a pressure regulating valve and a first cut-off valve connected in series to the air source; a conduit including two parallel branches connected to the first cut-off valve; each conduit branch including a second cut-off valve, an air tight receptacle, a third cut-off valve and a container sequentially connected therein; and a differential pressure thansducer for indicating the difference in pressure between the two receptacles; the two receptacles being of the same size and adapted to contain a test or reference piece and the two containers being the same size.

* * * * *